United States Patent
Dean

(10) Patent No.: US 6,874,151 B1
(45) Date of Patent: Mar. 29, 2005

(54) INTERPROCESS COMMUNICATION MECHANISM FOR HETEROGENEOUS COMPUTER PROCESSES

(75) Inventor: Dawson F. Dean, Piedmont, CA (US)

(73) Assignee: Microsoft Corp., Redmond, WA (US)

( * ) Notice: Subject to any disclaimer, the term of this patent is extended or adjusted under 35 U.S.C. 154(b) by 0 days.

(21) Appl. No.: 08/897,217

(22) Filed: Jul. 14, 1997

(51) Int. Cl.[7] .................................................. G06F 9/54
(52) U.S. Cl. ....................................................... 719/330
(58) Field of Search ................................. 719/330, 320; 709/201–203, 219, 304, 300, 310, 313, 330; 707/500, 501, 10

(56) References Cited

U.S. PATENT DOCUMENTS

| | | | | |
|---|---|---|---|---|
| 5,572,643 A | * | 11/1996 | Judson ........................ | 709/218 |
| 5,715,453 A | * | 2/1998 | Stewart ....................... | 395/615 |
| 5,742,768 A | * | 4/1998 | Gennaro et al. ........ | 395/200.33 |
| 5,754,857 A | * | 5/1998 | Gadol .......................... | 395/680 |
| 5,761,673 A | * | 6/1998 | Bookman et al. ........... | 707/104 |
| 5,805,829 A | * | 9/1998 | Cohen et al. .......... | 395/200.32 |
| 5,870,544 A | * | 2/1999 | Curtis ......................... | 713/201 |
| 5,956,483 A | * | 9/1999 | Grate et al. ................. | 709/203 |
| 6,012,083 A | * | 1/2000 | Savitzky et al. ............ | 709/202 |
| 6,012,090 A | * | 1/2000 | Chung et al. ............... | 709/219 |
| 6,052,710 A | * | 4/2000 | Saliba et al. ................ | 709/203 |
| 6,067,579 A | * | 5/2000 | Hardman et al. ........... | 709/328 |
| 6,119,166 A | * | 9/2000 | Bergman et al. ............ | 709/232 |
| 6,125,352 A | * | 9/2000 | Franklin et al. ............. | 705/26 |

OTHER PUBLICATIONS

Jaworski, Jamie. "Java Developer's Guide". Chapter 27, Server Programs. Library of Congress. 1996. pp. 514–526.*
Sommers, Bret. "Distributing Java: Remote Objects for Java." Java World. Jun. 1996, p. 1–9.*
Dumitrescu, Romeo. "Two–Stage Programming via the Client–Servlet–Coprocess Interaction Model." Oct. 19, 1998.*
Bhargava, Hemant et al. "The World Wide Web: Opportunities for Operations Research and Management Science." 1994.*
Sun Microsystems. "Java Remote Method Invocation." 1997–2001.*
Linthicum, David S. "The Java APIs." Internet Sytems. Apr. 1997.*
Sun Microsystems. "Java Remote Method Invocation Specification", Feb. 1997.*
Person. "Using Windows 95". 1995.*

* cited by examiner

Primary Examiner—Lewis A. Bullock, Jr.
(74) Attorney, Agent, or Firm—Lee & Hayes PLLC

(57) ABSTRACT

An applet which executes in isolation within an applet viewer builds and sends remote procedure calls by encoding remote procedure calling (RPC) requests as requests for documents in a known, standard document request format, such as a hypertext transfer protocol (HTTP) universal resource locator (URL). A portion of the name space for documents which can be retrieved according to HTTP is reserved for RPC requests. The applet process encodes an RPC request as a request to receive a document in the portion of the name space reserved for RPC requests and sends the URL to an RPC process. The RPC process receives the URL and determines that the URL specifies a document in the name space portion reserved for RPC requests and parses the RPC request from the URL and services the RPC request. In addition, the RPC process places any results produced by servicing the RPC request into a document which is then sent to the applet. In addition, the applet sends an HTTP URL which indicates the applet is ready to process RPC requests from the RPC process. In response, the RPC process sends RPC requests as portions of a virtual document which is sent to the applet in response to the HTTP URL. The applet receives the portions of the virtual document, parses the RPC requests therefrom, and processes the parsed RPC requests.

20 Claims, 6 Drawing Sheets

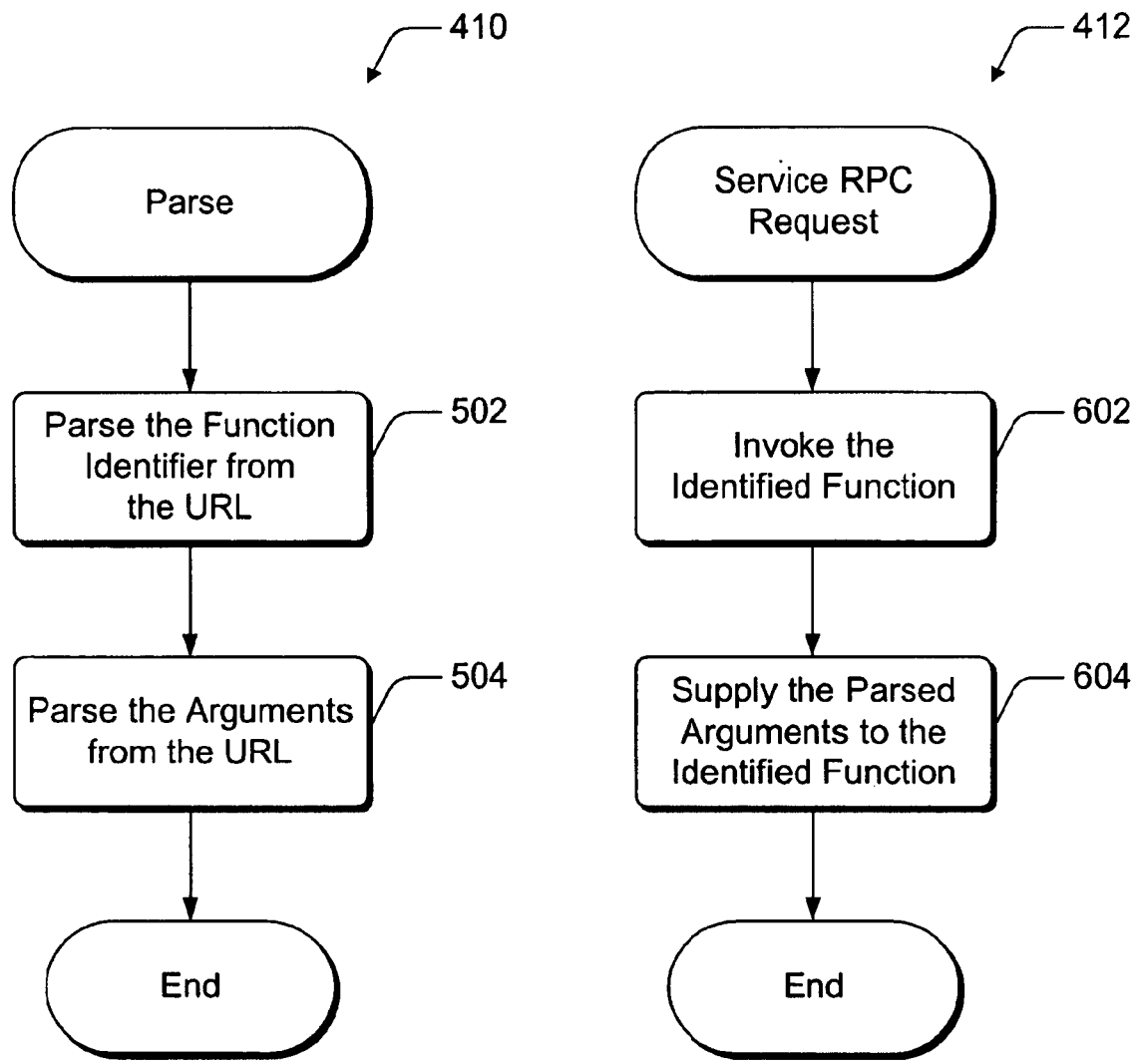

INTERPROCESS COMMUNICATION MECHANISM FOR HETEROGENEOUS COMPUTER PROCESSES

FIELD OF THE INVENTION

The present invention relates to computer software and, in particular, to a safe interprocess communication mechanism for communication with isolated computer processes.

BACKGROUND OF THE INVENTION

One of the latest, most exciting advances in popular computing is the advent and growth of the Internet and, in particular, the World Wide Web. The World Wide Web supports inter-related multimedia documents in which users can select, using conventional graphical user interfaces, which related document to display next. Such multimedia documents can include text, graphics, audio, and/or motion video. Within the sphere of Internet computing, one of the most exciting and promising developments is the development of applets written, for example, in the Java programming language developed by Sun Microsystems, Inc. of Mountain View, Calif. By supporting applets in the World Wide Web, active documents, i.e., documents which cause processing in a local computer when viewed, are added to the types of multimedia documents which can be accessed and viewed through the World Wide Web and other network protocols.

An applet is a collection of computer instructions which are designed to be transported through a computer network and executed within an applet viewing process executing within a local computer system. The computer system is local from the perspective of a user who requests retrieval and execution of the applet. Applets, by their very nature, raise security issues for such local computer systems. In general, computer programs can be configured, intentionally or inadvertently, to cause harm to the local computer system. Such harm can include, for example, erasing contents of persistent storage devices such as magnetic and optical disks, writing to sensitive areas of memory which are necessary for the proper functioning of the local computer system, and searching storage for sensitive information such as passwords and passing such information to a recipient elsewhere on the computer network.

Applet viewing processes are sometimes referred to herein as applet viewers. Applet viewers, such as the Netscape Navigator World Wide Web viewer available from Netscape Corporation of Mountain View, Calif., generally prevent certain types of behavior of an applet to prevent harm from execution of the applet. For example, applets are prevented by the applet viewer from writing data to any persistent storage, thus protecting current contents of the persistent storage. In addition, some applet viewers perform array bounds checking and memory address checking to ensure that an applet does not read data from or write data to a portion of memory to which the applet should not have access. Similarly, while general purpose programming languages allow mathematic operations to be performed on memory address pointers for added flexibility, such is generally not permitted of applets since such makes checking memory access for unauthorized addresses particularly difficult.

Some applet viewers provide a virtual machine in which the applet executes. The virtual machine includes a virtual processor which executes computer instructions from an instruction set, and applets are constructed of computer instructions of that instruction set. In executing the applet, the computer instructions of the applet are translated into a native instruction set capable of execution by the physical processor of the local computer system and then executed by the physical processor. In addition, the virtual machine has a virtual memory space which is used by the applet as if the virtual memory space was a physical memory space accessed by a conventional computer process. The applet viewer translates addresses of the virtual memory space into addresses in a physical memory space of the local computer system and effects memory access by the applet in the physical memory space. The applet viewer can therefore prevent the applet from gaining access to sensitive information stored in the physical memory space of the local computer system. The result of the virtual machine is that the applet perceives itself to be the sole computer process within a computer, namely, the virtual machine. The applet is therefore intentionally isolated by the applet viewer such that execution of the applet cannot interfere with the proper functioning of the local computer system and other computer processes executing therein.

One disadvantage of such isolation of applets is that other computer processes executing concurrently with and independently of the applet viewer cannot communicate with applets executing in the virtual machine. A computer process is a collection of computer instructions which define a task to be performed by a computer and an execution state which includes, for example, an address space for storing data which can be manipulated by execution of one or more of the computer instructions. Many computer programs in use today are not implemented as a single computer process but as multiple computer processes which communicate with one another through conventional interprocess communication mechanisms. In addition, many computer processes serve as server computer processes to receive processing requests for client computer processes and to process such requests. Thus, one attribute of a computer process which is currently highly desirable in certain computer processing environments is the attribute of responsiveness to processing requests of another computer process.

Applets are generally prevented from using any conventional means for receiving and responding to computer processing requests from other computer processes. Many conventional interprocess communication protocols operate at a low level, i.e., by direct manipulation of computer system resources. As described above, such direct manipulation of resources of the client computer system is typically disallowed by the applet viewer. Higher level protocols for interprocess communication would require modification of the applet viewer to implement such an interface with the applet. However, the developer of the applet and the developer of the applet viewer are most frequently separate entities such that modification of the applet viewer by the developer of the applet itself is impractical.

What is needed is an interprocess communication mechanism in which applets can receive and respond to processing requests of other computer processes and can send processing requests to such other computer processes without requiring modification of applet viewers. In addition, the interprocess communications mechanism should not submit the local computer system to undue risks of harm from the applets whether the applets are malicious or negligent.

SUMMARY OF THE INVENTION

In accordance with the present invention, interprocess communication between a computer process and an applet executing within an applet viewer is achieved by encoding remote procedure calling (RPC) requests as requests for documents in a known, standard document request format, such as a hypertext transfer protocol (HTTP) universal resource locator (URL). As used herein, a document is a data file which can store a collection of data such as data representing text, one or more graphical images, audio sounds, and/or motion video. A portion of the name space of documents which can be retrieved in HTTP is reserved for RPC requests. An applet encodes an RPC request as a request to receive a document in the portion of the name space reserved for RPC requests and sends the URL to an RPC process. The RPC process includes an HTTP server and (i) receives the URL; (ii) determines that the URL specifies a document in the name space portion reserved for RPC requests; (iii) parses the RPC request from the URL; and (iv) services the RPC request. In addition, the RPC process places any results produced by servicing the RPC request into a document which is then sent to the applet.

By using a known, standard document retrieval mechanism such as HTTP, URLs, RPC interprocess communication can be implemented in isolated computer processes such as applets executing in an applet viewer. Specifically, one of the few things an applet viewer permits an applet to do is request a document according to a known, trusted document retrieval protocol such as HTTP. From the perspective of the applet viewer, the RPC request is no more than an HTTP URL which requests retrieval of a document according to the hypertext transfer protocol and is therefore permitted. In addition, since the results of the execution of the requested RPC function are sent to the applet as a document in accordance with HTTP, the applet viewer perceives the receipt of the results as no more than the receipt of the requested document according to HTTP. In addition, since the applet is still denied direct access to computer system resources, computer system security is preserved.

Further in accordance with the present invention, an applet can make itself available to serve RPC requests from an independently executing computer process. Specifically, the applet encodes as an HTTP URL data indicating that the applet is available to process RPC requests. As described above, the applet viewer permits the applet to send HTTP URL requests to computer processes which implement an HTTP server. In response to the URL, the computer process begins sending a virtual document to the applet. Sending of the virtual document is suspended until the computer process has a processing request for the applet. The computer process builds an RPC request representing the processing request and sends the RPC request to the applet as a portion of the virtual document sent in response to the URL received from the applet. Upon receipt of the portion of the virtual document, the applet parses the RPC request and services the RPC request. Accordingly, the applet can serve RPC requests of independent computer processes in a manner permitted by an applet viewer without compromising computer system security.

BRIEF DESCRIPTION OF THE DRAWINGS

FIG. 5 is a logic flow diagram of the parsing of the RPC request by the RPC computer process of FIG. 2.

FIG. 6 is a logic flow diagram of the servicing of the RPC request by the RPC computer process of FIG. 2.

DETAILED DESCRIPTION

Figure 1:
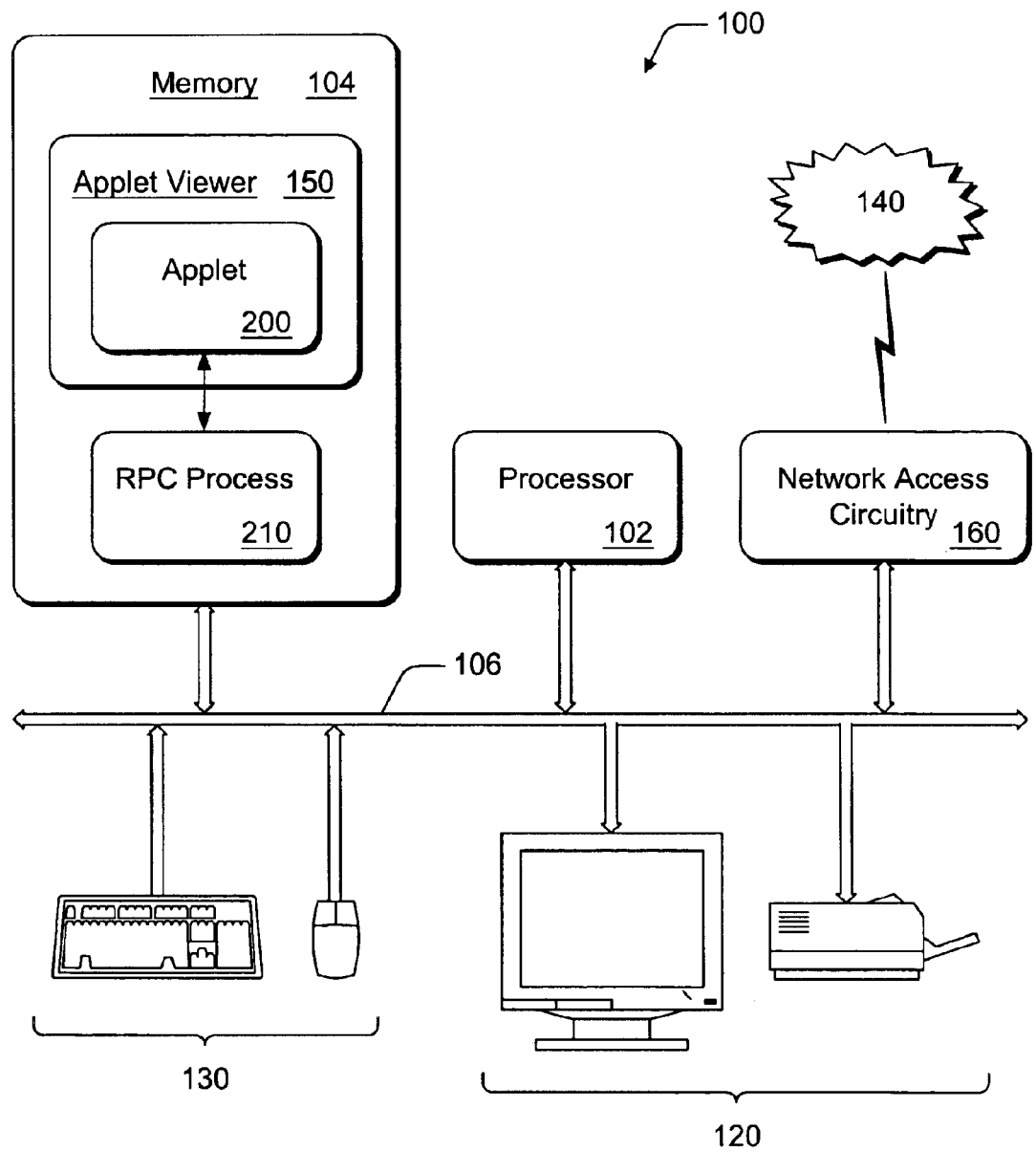
FIG. 1 is a block diagram of a computer system which includes an applet, an applet viewer, and an RPC computer process in accordance with the present invention.

In accordance with the present invention, remote procedure calling (RPC) requests are encoded as requests for documents in a known, standard document request format, such as an hypertext transfer protocol (HTTP) universal resource locator (URL). A portion of the name space for documents which can be retrieved in HTTP is reserved for RPC requests. An applet 200 (FIG. 1) encodes an RPC request as a request to receive a document in the portion of the name space reserved for RPC requests and sends the URL to an RPC process 210. RPC process 210 receives the URL and determines that the URL specifies a document in the name space portion reserved for RPC requests and parses the RPC request from the URL and services the RPC request. In addition, RPC process 210 places any results produced by servicing the RPC request into a document which is then sent to applet 200. In this way, applet 200 communicates RPC requests to RPC process 210 in a manner generally permitted by applet viewer 150 within which applet 200 executes. In addition, applet 200 can make itself available to receive RPC requests from RPC process 210 in a manner generally permitted by applet viewer 150 as described more completely below.

In the illustrative embodiment described herein, applet 200 is an applet which executes within applet viewer 150 which is part or all of a computer process executing within a computer system 100, and RPC process 210 is part or all of a computer process executing within a computer system 100.

Computer system 100 includes a processor 102 and memory 104 which is coupled to processor 102 through an interconnect 106. Interconnect 106 can be generally any interconnect mechanism for computer system components and can be, for example, a bus, a crossbar, a mesh, a torus, or a hypercube. Processor 102 fetches from memory 104 computer instructions of a computer process such as applet viewer 150 and executes the fetched computer instructions. In addition, processor 102 can fetch computer instructions through computer network 140 through network access circuitry 160 such as a modem or ethernet network access circuitry. Processor 102 also reads data from and writes data to memory 104 and sends data and control signals through interconnect 106 to one or more computer display devices 120 and receives data and control signals through interconnect 106 from one or more computer user input devices 130 in accordance with fetched and executed computer instructions.

Memory 104 can include any type of computer memory and can include, without limitation, randomly accessible memory (RAM), read-only memory (ROM), and storage devices which include storage media such as magnetic and/or optical disks. Memory 104 stores applet viewer 150 and RPC process 210 which are computer processes which execute concurrently and independently within processor 102 from memory 104.

Each of computer display devices 120 can be any type of computer display device including without limitation a printer, a cathode ray tube (CRT), a light-emitting diode (LED) display, or a liquid crystal display (LCD). Each of computer display devices 120 receives from processor 102 control signals and data and, in response to such control signals, displays the received data. Computer display devices 120, and the control thereof by processor 102, are conventional.

Each of user input devices 130 can be any type of user input device including, without limitation, a keyboard, a numeric keypad, or a pointing device such as an electronic mouse, trackball, light-pen, touch-sensitive pad, digitizing tablet, thumb wheels, or joystick. Each of user input devices 130 generates signals in response to physical manipulation by a user and transmits those signals through interconnect 106 to processor 102.

Figure 2:
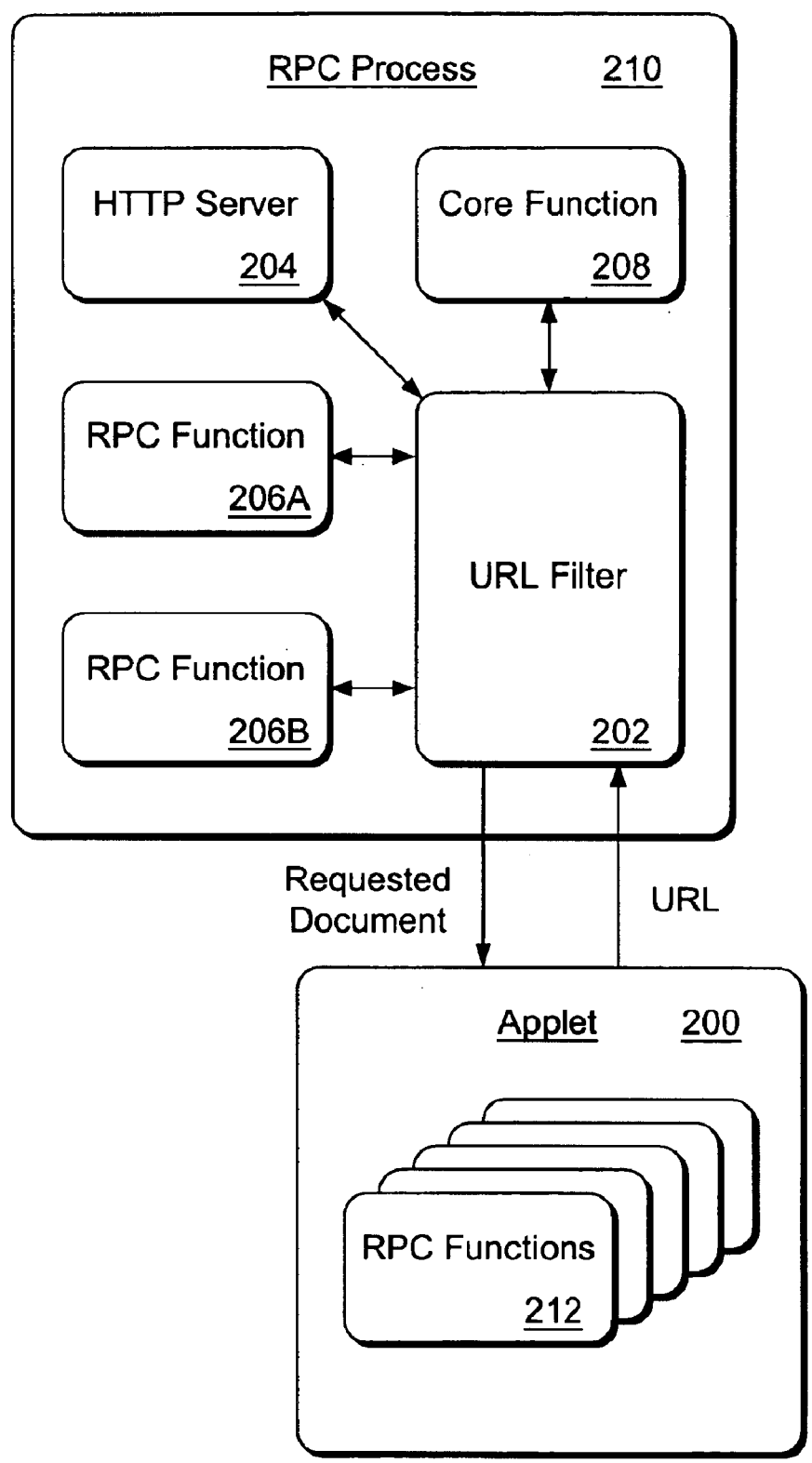
FIG. 2 is a block diagram showing the applet and RPC computer process of FIG. 1 in greater detail.
Figure 3:
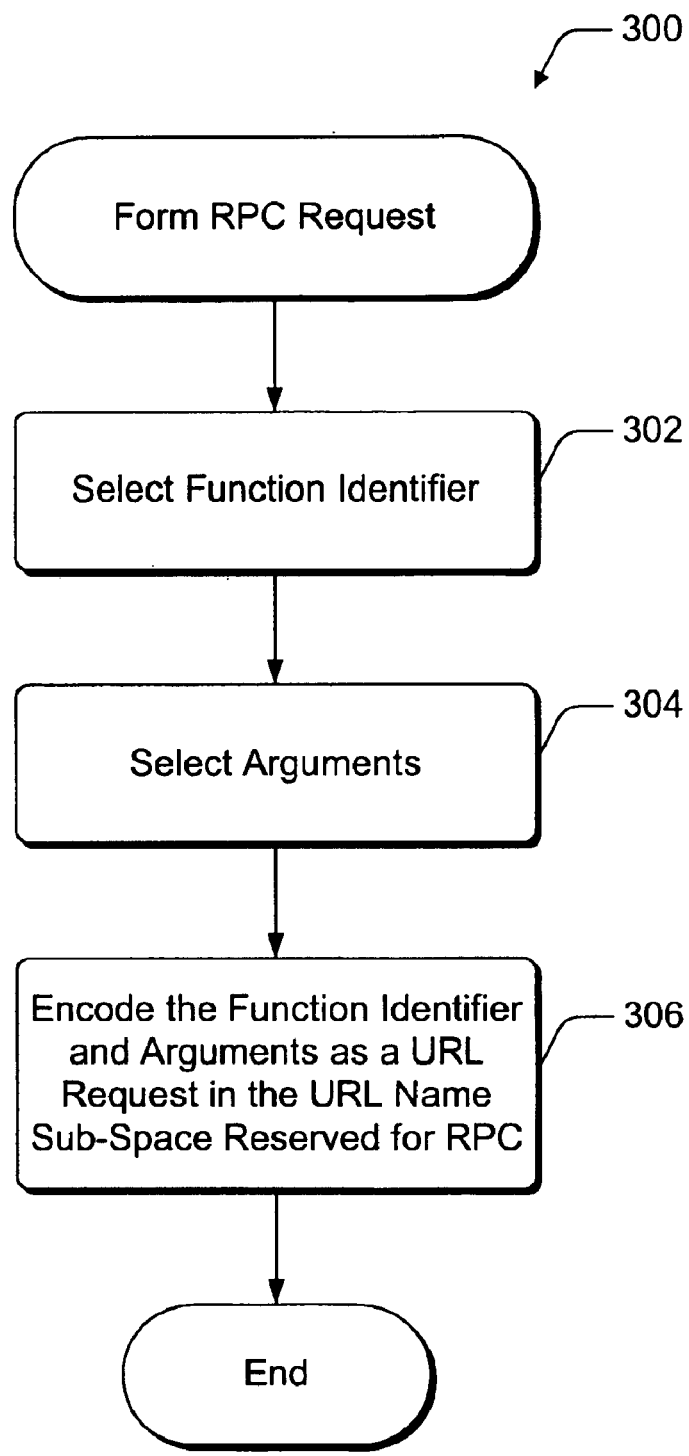
FIG. 3 is a logic flow diagram of the processing of the initiation of an RPC request by the applet of FIG. 2.

RPC process 210 and applet 200 are described in greater detail in the context of FIG. 2. Applet 200 is configured to invoke RPC functions, e.g., either of RPC functions 206A–B of RPC process 210, to thereby incorporate the tasks performed by such RPC functions into a larger task performed by applet 200. RPC process 210 includes an HTTP server 204 which serves HTTP requests in a conventional manner, i.e., receives a URL which specifies a requested document and produces the requested document in response to the received URL. RPC process 210 also includes a URL filter 202 and RPC functions 206A–B. URL filter 202 reserves a portion of the name space of documents which can be requested using a URL for RPC requests. As described more completely below, URL filter 202 determines whether a particular URL specifies a document in the reserved name space portion and processes the URL accordingly. In accordance with HTTP, applet 200 sends a URL specifying a document to RPC process 210 and receives the specified document from RPC process 210. To invoke either of RPC functions 206A–B, applet 200 forms a URL according to the steps of logic flow diagram 300 (FIG. 3) and sends the URL to RPC process 210.

In step 302, applet 200 (FIG. 2) selects a function identifier, i.e., data which uniquely identifies either RPC function 206A or RPC function 206B. In one embodiment, the function identifier is alphanumeric. In step 304 (FIG. 3), applet 200 (FIG. 2) selects zero or more arguments to supply to the identified RPC function as input data. The particular RPC function identified and the particular arguments to be provided to the identified RPC function are determined according to the particular task to be performed by applet 200 in accordance with the design and implementation of applet 200. In step 306 (FIG. 3), applet 200 (FIG. 2) encodes the function identifier and arguments as a URL request in the reserved name space portion to thus encode the function identifier and arguments as an RPC request.

RPC process 210 receives the encoded URL in step 402 (FIG. 4) of logic flow diagram 400 and processes the URL, and all other URLs, according to logic flow diagram 400. Processing transfers to test step 404 in which URL filter 202 (FIG. 2) of RPC process 210 determines whether the URL is an encoded RPC request, i.e., whether the received URL specifies a document in the reserved name space portion. The entire name space for all URLs includes (i) an identifier for a particular host, which can specify server computer system 102 (FIG. 1), for example, (ii) a port through which the host is accessed, (iii) one or more embedded directories, and (iv) a file name. The portion of the name space which is reserved for RPC requests can be any of the following or any combination of the following: (i) a specific host identifier, (ii) one or more specific directories, or (iii) a specific pattern in the file name. In one embodiment, the reserved name space portion is a particular directory such that URLs specifying the particular directory, or any subdirectory thereof, are recognized by URL filter 202 as RPC requests. In test step 402 (FIG. 4), URL filter 202 (FIG. 2) determines whether the received URL is an RPC request by comparing one or more components of the URL to specific component values reserved from the URL name space for RPC requests.

Figure 4:
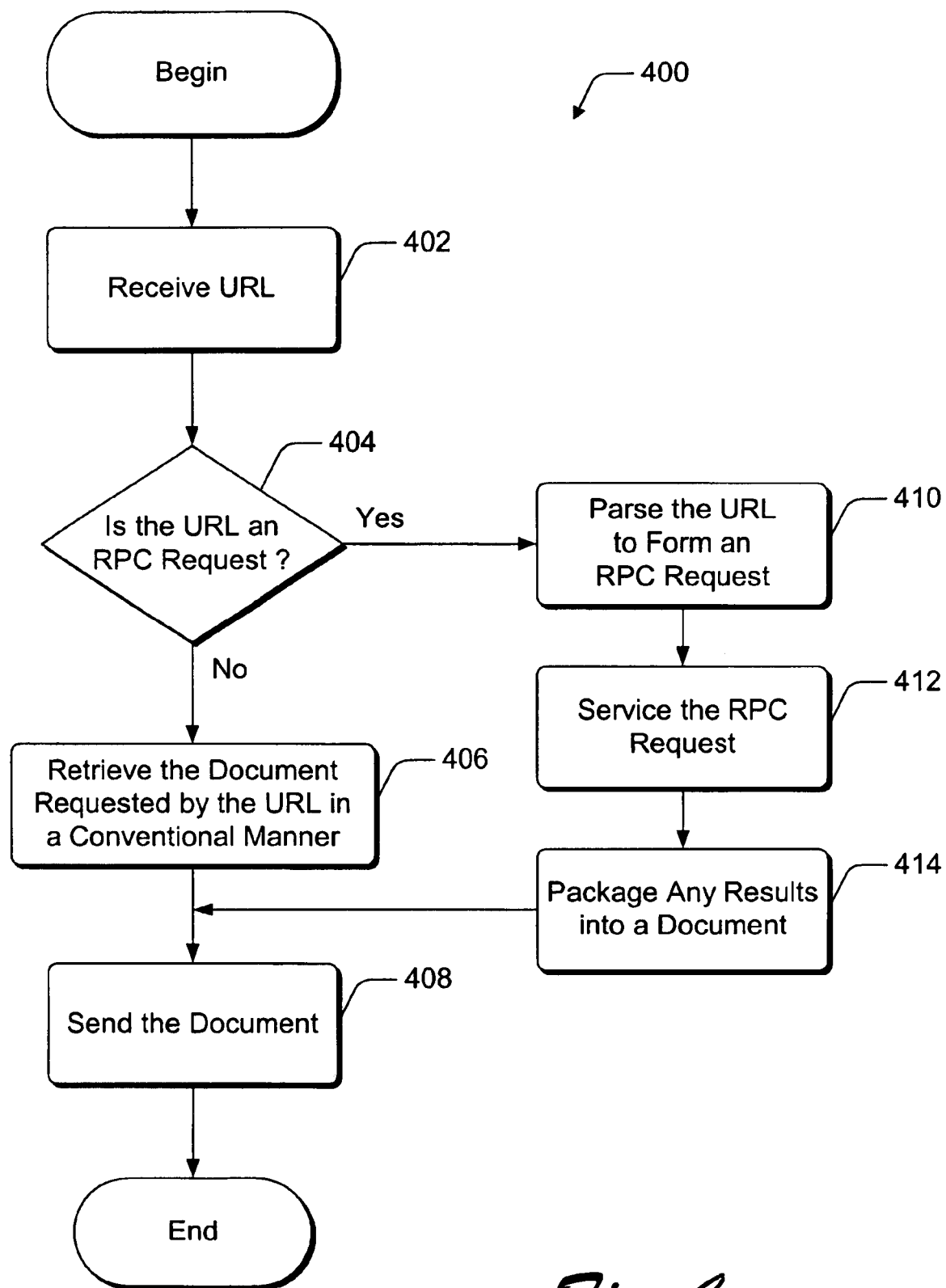
FIG. 4 is a logic flow diagram of the processing of the RPC request by the RPC computer process of FIG. 2.

If URL filter 202 (FIG. 2) determines that the received URL is an RPC request, processing transfers to step 410 (FIG. 4) which is described more completely below. Conversely, if URL filter 202 (FIG. 2) determines that the received URL is not an RPC request, processing transfers to step step 406 (FIG. 4). In step 406, URL filter 202 (FIG. 2) forwards the received URL to HTTP server 204 which processes the URL in a conventional manner, i.e., retrieves the document specified by the URL and provides the specified document to URL filter 202.

In step 410 (FIG. 4), to which processing transfers from test step 404 if URL filter 202 (FIG. 2) determines that the received URL is an RPC request, URL filter 202 (FIG. 2) parses the received URL into an RPC request. Step 410 (FIG. 4) is shown in greater detail as logic flow diagram 410 (FIG. 5). In step 502, URL filter 202 (FIG. 2) parses the RPC function identifier from the received URL. The following is an illustrative example of a URL representing an RPC request.

$$\text{http://serverhost:7123/function=function.name\&arg1=} \\ \text{arg1.data\&arg2=arg2.data\&arg3=arg3.data} \quad (1)$$

In URL (1), "http" indicates that URL specifies a document to be retrieved according to HTTP. While the hypertext transfer protocol (HTTP) is described in the illustrative example described herein, it is appreciated that other protocols which allow for data transfer can be used. Protocols which are widely implemented and supported, secure, and largely trusted are preferred. For example, the known file transfer protocol (FTP), Gopher, simple mail transfer protocol (SMTP), and Internet relay chat (IRC) are protocols in which RPC requests can be encoded as document requests. "Serverhost" identifies computer system 100 (FIG. 1) as the host to which the URL is directed through network 140. "7123" identifies a port of computer system 100.

The remainder of URL (1) syntactically specifies a file within computer system 100 that is to be retrieved through a logical port whose identifier is 7123. However, the remainder of URL (1) in effect specifies an RPC function and provides three arguments to be used as input data by the specified RPC function. Specifically, "function= function.name" identifies one of RPC functions 206A–B (FIG. 2) as the RPC function to be executed on behalf of applet 200. In addition, "arg1=arg1.data&arg2= arg2.data&arg3=arg3.data" specifies that the alphanumeric data strings "arg1.data," "arg2.data," and "arg3.data" are to be supplied to the identified RPC function as input data. It is appreciated that "function=function.name&arg1= arg1.data&arg2=arg2.data&arg3=arg3.data" can be an invalid file specification within computer system 100 (FIG. 1) and can therefore identify no valid document within computer system 100. However, URL filter 202 (FIG. 2) can be configured to accept as RPC requests URLs which cannot identify an actual document stored within computer system 100 (FIG. 1). All that is important is that the specification of the RPC function and arguments comports with the syntax of a HTTP URL such that applet viewer 150 permits the RPC request encoded as a URL to be sent to RPC process 210.

In step 502 (FIG. 2), URL filter 202 (FIG. 2) parses "function.name" from URL (1) to determine which of RPC functions 206A–B to invoke. In this illustrative example, "function.name" identifies RPC function 206A. In step 504 (FIG. 5), URL filter 202 (FIG. 2) parses the alphanumeric data strings "arg1.data," "arg2.data," and "arg3.data" from URL (1). After step 504 (FIG. 5), processing according to logic flow diagram 410, and therefore step 410 (FIG. 4), completes.

In step 412, URL filter 202 (FIG. 2) of applet 200 services the RPC request parsed from the URL received in step 402 (FIG. 4). Step 412 is shown in greater detail as logic flow diagram 412 (FIG. 6) in which processing begins in step 602. In step 602, URL filter 202 (FIG. 2) invokes execution of the RPC function identified by URL received in step 402 (FIG. 4), e.g., RPC function 206A (FIG. 2) identified by URL (1) above. In step 604 (FIG. 6), URL filter 202 (FIG. 2) supplies the arguments parsed in step 504 (FIG. 5) to the identified RPC function as input data. As a result, the identified RPC function, e.g., RPC function 206A (FIG. 2), performs the task requested by applet 200. After step 604, processing according to logic flow diagram 412, and therefore step 412 (FIG. 4), completes.

Processing transfers to step 414 in which URL filter 202 (FIG. 2) receives from RPC function 206A any results produced by execution of RPC function 206A and packages those results into a document. Processing transfers from either step 414 (FIG. 4) or step 406 to step 408. In step 408, URL filter 202 (FIG. 2) sends a document to applet 200. The document includes the results as packaged in step 414 (FIG. 4) if the received URL is an RPC request or is the document requested by the received URL otherwise.

Thus, according to the present invention, an RPC request is encoded as a URL which appears to request a document according to the hypertext transfer protocol. Many applet viewers, such as applet viewer 150, execute applets such as applet 200 and allow such applets to send requests for documents according to standardized, trusted protocols and allow such applets to receive documents in response to such requests. As a result, encoding RPC requests as URLs which appear to request a document according to HTTP allows an applet executing within an applet viewer to send RPC requests to processes executing independently of the applet viewer notwithstanding isolation imposed upon such applets by applet viewers.

Receipt and Processing of RPC Requests by Applet 200

Figure 7:
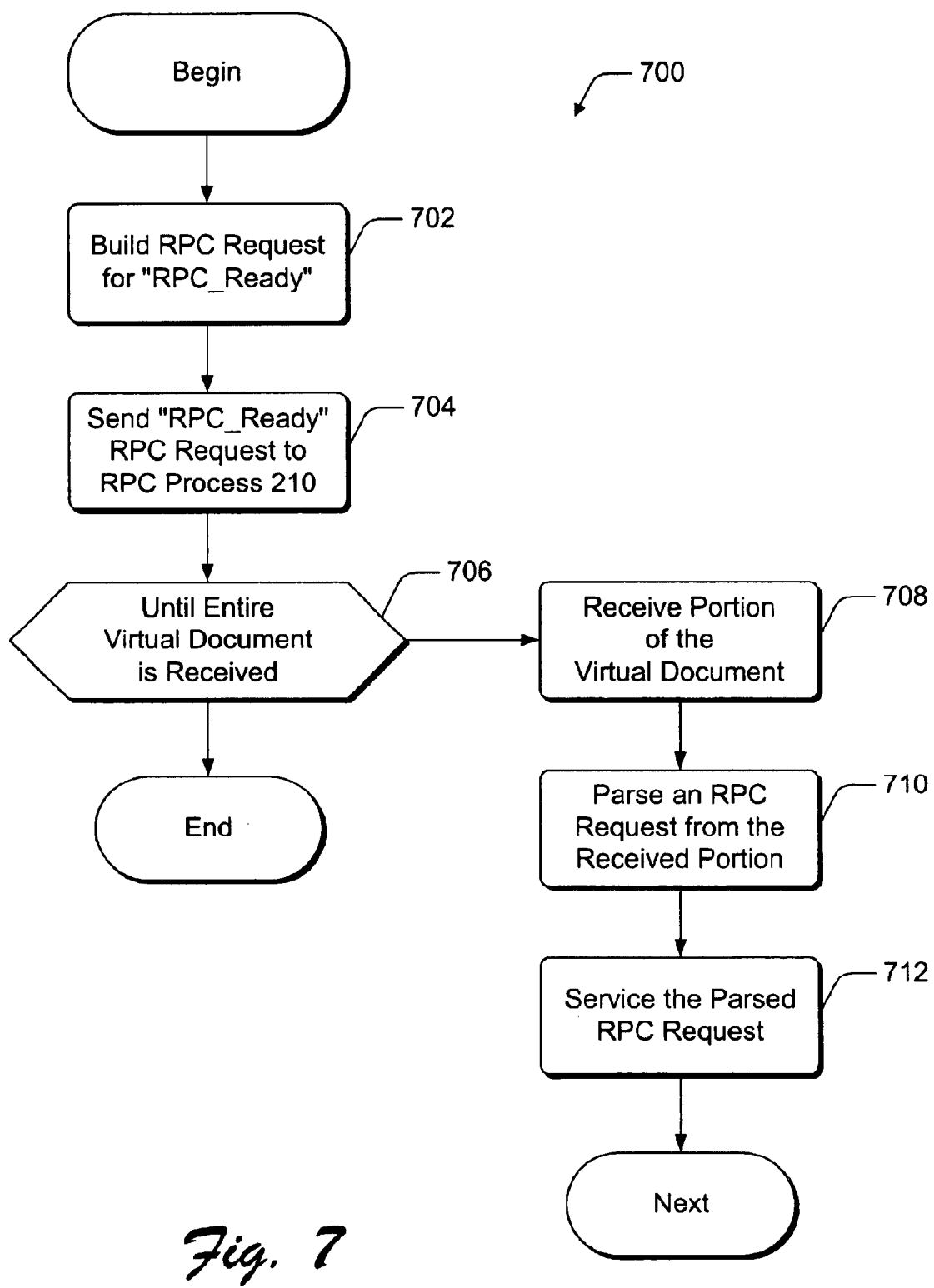
FIG. 7 is a logic flow diagram of the manner in which the applet of FIG. 2 makes itself available to process RPC requests from the RPC computer process of FIG. 2.

Applet 200 (FIG. 2) can make itself available to receive RPC requests from RPC process 210 in a manner which is generally permitted by applet viewer 150 (FIG. 1) and which is illustrated in logic flow diagram 700 (FIG. 7). Processing according to logic flow diagram 700 begins in step 702.

In step 702, applet 200 (FIG. 2) builds an RPC request for execution of an "RPC ready" RPC function by RPC process 210 and encodes the RPC request as a URL in the manner described more completely above. In step 704 (FIG. 7), applet 200 (FIG. 2) sends the URL encoded in step 702 (FIG. 7) to RPC process 210 to thereby request execution of the "RPC ready" RPC function, which can be RPC function 206B, for example.

The design and implementation of RPC function 206B is such that execution thereof indicates to RPC process 210 that applet 200 is ready to receive RPC requests from RPC process 210 and establishes a communications channel through which RPC process 210 can send RPC requests to applet 200. Specifically, HTTP, as implemented by both RPC process 210 and applet viewer 150 (FIG. 1) within which applet 200 executes, expects a document to be retrieved in response to the URL sent in step 704 (FIG. 7). In addition, HTTP as implemented permits transfer of the requested document to be delayed and intermittent. However, RPC process 210 requests a virtual document, i.e., a document which does not exist within memory 104 (FIG. 1) of computer system 100 but which is instead created in response to the URL. Execution of RPC function 206B (FIG. 2) of RPC process 210 changes the state of RPC process 210 to indicate that applet 200 is ready to receive RPC requests and to store data identifying the communications channel through which applet 200 is waiting to receive a document in response to the URL sent in step 704 (FIG. 7).

RPC process 210 includes a core function 208 which defines and implements a central task for which RPC process 210 is designed. Execution of core function 208 can include sub-tasks which are implemented by one or more of RPC functions 212 of applet 200. Accordingly, to cause performance of such sub-tasks, core function 208 of RPC process 210 builds RPC requests which request execution of a selected one of RPC functions 212 and includes zero or more parameters to be used by the selected RPC function as input data. To send such an RPC request to applet 200, RPC process 210 sends the RPC request to applet 200 as a portion of the virtual document requested by the URL sent by applet 200 in step 704 (FIG. 7). By sending the RPC request as only a portion of the request virtual document, RPC process 210 (FIG. 2) indicates to applet 200 that other RPC requests can be subsequently sent to applet 200 through the same communication channel. Since the RPC request is sent to applet 200 as part of a document, the contents of which are not constrained by any particular protocol such as HTTP, the RPC request can be in any convenient form and can be in a form which is entirely inappropriate for a HTTP URL. To terminate the communication channel, and therefore terminate the ability of applet 200 to receive RPC requests from RPC process 210, RPC process 210 sends data indicating that the entirety of the virtual document requested by applet 200 has been sent to applet 200.

Processing by applet 200 transfers from step 704 (FIG. 7) to loop step 706 in which steps 708–712 are performed repeatedly until applet 200 (FIG. 2) receives data indicating that the entirety of the requested virtual document has been received. In step 708 (FIG. 7), applet 200 (FIG. 2) receives a portion of the virtual document from RPC process 210. In step 710 (FIG. 7), applet 200 (FIG. 2) parses an RPC request from the received portion. As described above, the format of the RPC request can be entirely independent of the format of HTTP URLs. In step 712 (FIG. 7), applet 200 (FIG. 2) services the parsed RPC request by executing one of RPC functions 212 specified by the parsed RPC request and supplying any arguments parsed from the received portion as input data. Any results produced by servicing the parsed RPC request can be communicated to RPC process 210 in the form of an HTTP URL built and sent to RPC process 210 in the manner described above. The results URL identifies the RPC functions 212 invoked by the parse RPC request to specify to RPC process 210 to which RPC request the resulting data pertains.

Steps 708–712 (FIG. 7) are repeated until applet 200 (FIG. 2) receives data from RPC process 210 indicating that the entirety of the requested virtual document has been sent to applet 200. Thereafter, processing according to logic flow diagram 700 completes.

In this way, applet 200 accepts RPC requests from RPC process 210 in a manner which is permitted by applet viewer 150 (FIG. 1) without requiring modification of applet viewer 150. Accordingly, many of the advantages of interprocess communication are achieved in the secure context of an applet viewer.

The above description is illustrative only and is not limiting. The present invention is limited only by the claims which follow.

What is claimed is:

1. A method for serving remote procedure calls from an applet which executes within an applet viewer which in turn executes in a computer system that is serving said remote procedure calls, the method comprising:

receiving from the applet which executes in the same computer system that serves said remote procedure calls, a request for a document according to a document retrieval protocol implemented on a computer network;

determining that the request specifies a function which is defined within a computer process executing independently of the applet and applet viewer and which includes one or more computer instructions, execution of which performs a task which is unrelated to both generation and retrieval of any document specified in the request; and executing the function in the same computer system that is executing said applet and applet viewer to thereby cause execution of the one or more computer instructions in response to receipt of the request.

2. The method of claim 1 wherein the step of determining comprises:

determining that the request includes a document specification which is in a portion of a name space reserved for function requests.

3. The method of claim 1 further comprising:

returning to the applet result data produced by execution of the function.

4. The method of claim 3 wherein the step of returning comprises:

forming a document which includes the data; and sending the document to the applet.

5. The method of claim 1 wherein the document retrieval protocol is HTTP.

6. The method of claim 1, wherein the function further comprises a Remote Procedure Call.

7. A computer readable medium useful in association with a computer system which includes a processor and a memory, the computer readable medium including computer instructions which are configured to cause the computer to serve remote procedure calls from an applet, which executes within an applet viewer which in turn executes in the computer system that is serving said remote procedure calls, by performing the steps of:

receiving from the applet which executes in the same computer system that serves said procedure calls, a request for a document according to a document retrieval protocol implemented on a computer network;

determining that the request specifies a function which is defined within a computer process executing independently of the applet and applet viewer and which includes one or more selected computer instructions, execution of which performs a task which is unrelated to both generation and retrieval of any document specified in the request; and executing the function in the same computer system that is executing said applet and applet viewer to thereby cause execution of the one or more selected computer instructions in response to receipt of the request.

8. The computer readable medium of claim 7 wherein the step of determining comprises:

determining that the request includes a document specification which is in a portion of a name space reserved for function requests.

9. The computer readable medium of claim 7 where the computer instructions are further configured to cause the computer to serve remote procedure calls by further performing the step of:

returning to the applet result data produced by execution of the function.

10. The computer readable medium of claim 9 wherein the step of returning comprises:

forming a document which includes the result data; and sending the document to the applet.

11. The computer readable medium of claim 7 wherein the document retrieval protocol is HTTP.

12. A computer system comprising:

a processor;

a memory operatively coupled to the processor; and a computer process which executes in the processor from the memory and which, when executed, serves remote procedure calls received from an applet which executes within an applet viewer which in turn executes in the processor from the memory concurrently and independently from the computer process, wherein the computer process serves the remote procedure calls by performing the steps of:

receiving from the applet which executes in the same computer system that serves remote procedure calls, a request for a document according to a document retrieval protocol implemented on a computer network;

determining that the request specifies a function which is defined within the computer process and which includes one or more computer instructions, execution of which performs a task which is unrelated to both generation and retrieval of any document specified in the request; and executing the function in the same computer system that is executing said applet and applet viewer to thereby cause execution of the one or more computer instructions in response to receipt of the request.

13. The computer system of claim 12 wherein the step of determining comprises:

determining that the request includes a document specification which is in a portion of a name space reserved for function requests.

14. The computer system of claim 12 where the computer process serves remote procedure calls by further performing the step of:

returning to the applet result data produced by execution of the function.

15. The computer system of claim 14 wherein the step of returning comprises:

forming a document which includes the result data; and sending the document to the applet.

16. The computer system of claim 12 wherein the document retrieval protocol in HTTP.

17. A method for serving remote procedure calls from an applet that executes within an applet viewer which executes in a computer system that serves the remote procedure calls, the method comprising:

receiving from the applet a request for a document according to a document retrieval protocol implemented in the computer system; and determining that the request for the document specifies a function which is defined within a computer process executing independently of the applet and the applet viewer and which includes computer executable instructions that, when executed, perform a task which is unrelated to both generation and retrieval of any document.

18. A method as recited in claim 17, further comprising executing the function in the computer system to perform the task when receiving of the request for the document.

19. A computer system, comprising:

one or more processors;

a memory component operatively coupled to the processor;

a computer process configured to execute in the one or more processors from the memory and serve remote procedure calls received from an applet that executes within an applet viewer which executes in the processor from the memory concurrently and independently from the computer process, wherein the computer process is further configured to:

receive from the applet a request for a document according to a document retrieval protocol implemented in the computer system;

determine that the request for the document specifies a function which is defined within the computer process and which includes computer executable instructions that, when executed, perform a task which is unrelated to both generation and retrieval of any document.

20. A computer system as recited in claim 19, wherein the computer process is further configured to execute the function in the computer system to perform the task in an event that the request for the document is received.

* * * * *